United States Patent
Kagawa

(10) Patent No.: US 8,815,386 B2
(45) Date of Patent: Aug. 26, 2014

(54) POLYMERIC COMPOSITION USEFUL AS ELECTRICAL CONDUIT COVERING AND INSULATED ELECTRICAL CONDUIT

(75) Inventor: Atsushi Kagawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 600 days.

(21) Appl. No.: 12/320,420

(22) Filed: Jan. 26, 2009

(65) Prior Publication Data

US 2009/0142527 A1   Jun. 4, 2009

(51) Int. Cl.
*B32B 27/32* (2006.01)
*C08K 3/22* (2006.01)
*C08L 23/10* (2006.01)

(52) U.S. Cl.
USPC .......... 428/330; 428/323; 428/500; 524/436; 174/110 R

(58) Field of Classification Search
None
See application file for complete search history.

(56) References Cited

U.S. PATENT DOCUMENTS

| | | | | |
|---|---|---|---|---|
| 5,194,184 | A * | 3/1993 | Takeyama et al. | 252/609 |
| 5,206,284 | A * | 4/1993 | Fukui et al. | 524/504 |
| 5,256,719 | A * | 10/1993 | Sham et al. | 524/436 |
| 6,025,423 | A * | 2/2000 | Breant | 524/412 |
| 8,097,809 | B2 * | 1/2012 | Galletti et al. | 174/110 R |
| 2004/0054054 | A1 * | 3/2004 | Blondel et al. | 524/416 |
| 2008/0213572 | A1 | 9/2008 | Halahmi et al. | |
| 2010/0204381 | A1 * | 8/2010 | Heck | 524/447 |

FOREIGN PATENT DOCUMENTS

| | | |
|---|---|---|
| CN | 1132224 A | 10/1996 |
| CN | 1468906 A | 1/2004 |
| EP | 1557443 A1 | 7/2005 |
| EP | 1739125 A1 | 1/2007 |
| JP | 06-290637 A | 10/1994 |
| JP | 2002-146118 | 5/2002 |
| JP | 2002-146118 A | 5/2002 |

OTHER PUBLICATIONS

Office Action mailed Dec. 7, 2011 issued for the corresponding Chinese Patent Application No. 200910134618.6.
Office Action mailed Nov. 29, 2011, issued for the corresponding Japanese patent application No. 2007-209501.
Office Action issued in German Patent Application No. 10 2009 008 065.1-43, dated Sep. 16, 2009.

* cited by examiner

*Primary Examiner* — Monique Jackson
(74) *Attorney, Agent, or Firm* — Edwards Wildman Palmer LLP; James E. Armstrong, IV

(57) ABSTRACT

The present invention is intended to provide a polymeric composition useful as an electrical conduit covering occupying only small space, having relatively low melting point, and exhibiting improved flame retardant properties. A polymeric composition useful as an electrical conduit covering comprises 100 parts by weight of polyolefin polymer serving as a base polymer, 2 to 45 parts by weight of polyamide, and 60 to 90 parts by weight of metal hydroxide. The polyamide is a copolymer of polyamide 6 and polyamide 66.

6 Claims, No Drawings

POLYMERIC COMPOSITION USEFUL AS ELECTRICAL CONDUIT COVERING AND INSULATED ELECTRICAL CONDUIT

BACKGROUND OF THE INVENTION

1. Field of the Invention

The present invention relates to a polymeric composition useful as an electrical conduit covering, in particular, suited for vehicles.

2. Description of the Related Art

Recently, vehicle parts are highly required to be small-sized. An insulated electrical conduit for vehicles is also required to be small-sized.

However, it has been considered to be highly difficult to confer excellent flame retardant properties to an insulated electrical conduit for vehicle, with the insulated electrical conduit maintaining its small size. That is, conventional small-sized cable cannot achieve satisfactory flame retardant properties. Also, when a particulate inorganic flame retardant component such as magnesium hydroxide is added to a polymeric composition useful as an electrical conduit covering in a large amount, its flame retardant properties can be improved. However, in this case, its mechanical properties are inclined to be remarkably lowered.

To overcome the afore-mentioned problems, it has been proposed to substitute a part of magnesium hydroxide component with polyamide. By means of this solution, a resultant insulated electrical conduit could exhibit improved flame retardant properties while maintaining its original mechanical properties.

In addition, Japanese Patent Publication 2002-146118 (A) discloses a polymeric composition comprising an olefin polymer and a polyamide having relatively high melting point above 200° C. In this case, due to the addition of the polyamide component the composition can achieve improved heat resistance. However, due to addition of the polyamide component the polymeric composition has a melting point higher than that of conventional olefin-based composition. Accordingly, in its subsequent shape forming process, higher temperature would be applied thereto. The application of higher temperature may cause not only thermal degradation of the composition itself, but thermal degradation of the respective polymer component that comprises the polymeric composition. Furthermore, the material strength and abrasion resistance of the resultant article such as an insulated electrical conduit may be adversely affected.

SUMMARY OF THE INVENTION

The present invention is provided for overcoming the problems long appreciated by one skilled in the art. The present invention is intended to provide a polymeric composition useful as an electrical conduit covering occupying only small space. The polymeric composition has relatively low melting point, and thus can exhibit excellent flame retardant properties. The polymeric composition in accordance with the present invention has relatively lower melting point compared to the cable covering polymeric compositions of the prior art, it can be thereafter shaped at a temperature in a range of not incurring thermal degradation thereof.

In one aspect, there is provided a polymeric composition useful as an electrical conduit covering, comprising:

100 parts by weight of a base polymer containing a polyolefin polymer;

2 to 45 parts by weight of a polyamide, based on 100 parts by weight of the base polymer, the polyamide being a copolymer of polyamide 6 and polyamide 66; and 60 to 90 parts by weight of a metal hydroxide, based on 100 parts by weight of the base polymer.

Preferably, the polyolefin polymer contains at least one polypropylene polymer therein.

In another aspect, there is also provided an insulated electrical conduit having an electrical conductor covered by the polymeric composition as state above.

DETAILED DESCRIPTION OF THE INVENTION

As base polymer, the polymeric composition in accordance with the present invention may comprise 55 to 98 parts by weight of polyolefin polymer and the reminder of polyamide component, per 100 parts by weight of the base polymer.

As the polyolefin polymer, the polymeric composition in accordance with the present invention may include, but is not limited to, polyethylene, polypropylene, polybutene, ethylene vinyl acetate copolymer, ethylene-ethylacrylate copolymer, ethylene-propylene rubber, ethylene-butene copolymer, and so on. Preferably, ethylene-propylene rubber is employed. This is because ethylene-propylene rubber can produce the polymeric composition having enhanced heat resistance and flexibility as required for an electrical conduit covering.

In this case, at least two afore-mentioned polyolefin polymers can be employed together. For example, when polypropylene polymer and ethylene-propylene rubber are blended in a ratio of equal to or below 4:1, it is guaranteed that the resultant insulted electrical conduit can have improved material strength properties.

As polypropylene polymer, the polymeric composition in accordance with the present invention may include, but is not limited to, homo-polypropylene, maleic acid-modified homo-polypropylene, ethylene-propylene rubber, and so on. Preferably, homo-polypropylene and maleic acid-modified homo-polypropylene are employed together for the improvement of strength properties of the resultant polymeric composition. In this case, when homo-polypropylene and maleic acid-modified homo-polypropylene are blended in a ratio of from 5:1 to 3:2, the polymeric composition can achieve good formability. The term "homo-polypropylene" is used herein to refer to polypropylene merely composed of propylene. The homo-polypropylene can be obtained from Prime Polymer Co., Ltd, Mitsubishi Engineering-Plastics Corporation, and so forth. The term "maleic acid-modified homo-polypropylene" is used herein to refer to anhydrous maleic acid-modified homo-polypropylene. The maleic acid-modified homopolypropylene can be obtained from Chemtura Corporation, Mitsui Chemicals Inc. and so forth.

As polyamide component, a polyamide having low melting point is preferably employed in the polymeric composition in accordance with the invention. As a polyamide having melting point equal to or lower than 190° C., copolymer of polyamide 6 and polyamide 66 has been known. For example, the afore-mentioned copolymer can be obtained from Toray Industries, Inc., Mitsubishi Engineering-Plastics Corporation, and so forth. When the copolymer of polyamide 6 and polyamide 66 is employed in the polymeric composition in accordance with the present invention, the polymeric composition can be shaped without incurring thermal degradation thereof. Therefore, the polymeric composition possessing improved processability characteristics.

In accordance with the polymeric composition in accordance with the present invention, the copolymer of polyamide 6 and polyamide 66 serving as the polyamide component may be present in an amount of from 2 parts by weight to 45 parts by weight, based on 100 parts by weight of the base polymer used. If the polyamide component were present in an amount of less than 2 parts by weight, sufficient flame retardant properties could not be achieved. On the contrary, if the polyamide component were present in an amount of greater than 45 parts by weight, sufficient mechanical strength could not be achieved.

One embodiment of the polymeric composition in accordance with the present invention may contain a metal hydroxide component, which is added to the base polymer used. As the metal hydroxide component, the polymeric composition in accordance with the present invention may include, but is not limited to, a divalent or trivalent metal ion of magnesium hydroxide, aluminum hydroxide, calcium hydroxide and so on. Preferably, magnesium hydroxide is employed in the polymeric composition in accordance with the present invention. It is desirable to employ the metal hydroxide having an average particle diameter of from 0.1 µm to 20 µm. The metal hydroxide may be subjected to surface treatment with a coupling agent, for the purpose of enhancing the affinity or miscibility with the other component, and also improving the abrasion resistance of the corresponding polymeric composition.

The polymeric composition in accordance with the present invention contains the metal hydroxide component in an amount of from 60 parts by weight to 90 parts by weight, based on 100 parts by weight of the base polymer used. If the metal hydroxide component were present in an amount of less than 60 parts by weight, based on 100 parts by weight of the base polymer used, sufficient flame retardant properties could not be conferred to the resultant polymeric composition. On the contrary, if the metal hydroxide component were present in an amount of greater than 90 parts by weight, based on 100 parts by weight of the base polymer used, mechanical properties such as abrasion resistance generally required for the electrical conduit covering could not be conferred to the resultant polymeric composition. In further detail, the metal hydroxide component has been conventionally added to the polymeric composition in an amount of equal to or less than 200 parts by weight based on 100 parts by weight of the base polymer used. In other words, the polymeric composition of prior art contains a large amount of metal hydroxide component therein. In this case, the mechanical properties of the resultant polymeric composition are never suited for a vehicle. On the other hand, the polymeric composition in accordance with the present invention contains the metal hydroxide component in an amount of equal to or less than 90 parts by weight based on 100 parts by weight of the base polymer used. Preferably, the polymeric composition in accordance with the present invention may contain the metal hydroxide component in an amount of from 70 parts by weight to 80 parts by weight, based on 100 parts by weight of the base polymer used.

The polymeric composition useful as an electrical conduit covering in accordance with the present invention may further include an anti-oxidant, a metal deactivator such as a copper inhibitor, a processing aid such as a lubricating agent or wax, a coloring agent, a pigment, a flame retardant such as zinc borate and silicon-based flame retardant and so on, all of which may be usually employed in the olefin-based polymeric composition. The component as mentioned above may be added in an appropriate amount, which has been well known to one skilled in the art.

The polymeric composition useful as electrical conduit covering in accordance with the present invention may further include at least one additional component, for example, a nitrogen-based flame retardant such as melamine cyanurate, a flame retardant aid such as zinc borate and a silicon-based flame retardant, a reinforcing agent such as clay, calcium carbonate, and talc, an anti-oxidant, a metal deactivator, a processing aid such as a lubricant, a coloring agent, a pigment and so on, all of which may be usually added to the polyamide-based polymeric compound. The additional component as mentioned above may be added in an appropriate amount, which has been well known to one skilled in the art.

The polymeric composition useful as an electrical conduit covering in accordance with the present invention can be prepared by blending and kneading the afore-mentioned components in any apparatus that is usually employed for the preparation of an insulating covering polymeric composition. Such an apparatus may include Bunbury's mixer, a roll mill, a press kneader, and so on. Generally, the base polymer is firstly prepared, and then at least one component other than the base polymer is added to the base polymer. However, a process for producing the polymeric composition useful as an electrical conduit covering in accordance with the present invention is never limited thereto. In other words, the base polymer may be added to the other component or the mixture of the other components.

Kneading can be carried out at a lowest temperature insomuch as kneading is permitted to be done. Specifically, the temperature is selected from 10° C. to 20° C. above the melting point of the copolymer of polyamide 6 and polyamide 66 used. In this case, the resultant electrical conduit covering can achieve excellent mechanical properties, by minimizing both the thermal history the thermal degradation of the polymeric composition itself.

The resultant polymeric composition useful as an electrical conduit covering in accordance with the present invention can be directly employed in the production of an insulated electrical conduit. However, the resultant composition may be subjected to further treatment such as pelletization, before being supplied to the process for producing the insulated electrical conduit.

During the production of the insulated electrical conduit from the polymeric composition in accordance with the present invention, a process usually employed in the preparation of an insulated electrical conduit may be utilized. For example, the production of an insulated electrical conduit involves extruding the polymeric composition. During the production of the insulated electrical conduit, in particular, the formation of an insulating covering, the relatively low temperature is selected in order to melt the polymer component. As a result, the resultant insulated electrical conduit can have an insulating covering possessing excellent mechanical properties. In particular, the temperature may be selected from 40° C. to 50° C. above the melting point of the copolymer of the polyamide 6 and polyamide 66 used.

The following examples are given to illustrate the scope of the present invention. Since, the examples are given for illustrative purposes only, the invention should not be limited thereto.

Preparation of a Polymeric Composition Used as an Electrical Conduit Covering

The Examples 1 to 8 and Comparative Examples A to K with respect to the polymeric composition useful as an electrical conduit covering were prepared. A summary of the polymeric composition of these examples 1 to 8 and Comparative Examples A to K are provided in Tables 1 to 3 below. In Tables 2 and 3, all of concentration or content levels are recited in "part by weight" unit. The respect polymeric composition was kneaded at a lowest temperature, insomuch as kneading was permitted to be done.

TABLE 1

| Abbrev. | | |
|---|---|---|
| HPP | homo-polypropylene | Prime Polymer Co., Ltd. |
| MMHPP | maleic acid-modified homopolypropylene | Chemtura Coporation |
| EPR | ethylene-propylene rubber | Prime Polymer Co., Ltd. |
| PA6 | polyamide 6 | Toray Industries, Inc. |
| PA66 | polyamide 66 | Mitsubishi Engineering-Plastics Corporation |
| PA-CP | copolymer of polyamide 6 and polyamide 66 | Toray Industries, Inc. |
| $Mg(OH)_2$ | magnesium hydroxide | Kyowa Chemical Industry Co., Ltd. |
| AA | anti-aging agent | ADEKA Corporation |

TABLE 2

| | | Example | | | | | | | |
|---|---|---|---|---|---|---|---|---|---|
| | | 1 | 2 | 3 | 4 | 5 | 6 | 7 | 8 |
| size of electrical conduit (cross-section of conductor in $mm^2$) | | 0.14 | | | | | | | 0.22 |
| HPP | | 55 | 55 | 55 | 55 | 55 | 55 | 55 | 55 |
| MMHPP | | 25 | 25 | 25 | 25 | 25 | 25 | 25 | 25 |
| EPR | | 20 | 20 | 20 | 20 | 20 | 20 | 20 | 20 |
| PA6 | | 0 | 0 | 0 | 0 | 0 | 0 | 0 | 0 |
| PA66 | | 0 | 0 | 0 | 0 | 0 | 0 | 0 | 0 |
| PA-CP | | 10 | 0 | 2 | 25 | 35 | 45 | 10 | 25 |
| $Mg(OH)_2$ | | 80 | 80 | 80 | 80 | 80 | 80 | 80 | 80 |
| AA | | 5 | 5 | 5 | 5 | 5 | 5 | 5 | 5 |
| properties | tensile elongation | P | P | P | P | P | P | P | P |
| | flame out time | P | P | P | P | P | P | P | P |
| | abrasion resistance | P | P | P | P | P | P | P | P |
| | residual anti-aging agent | P | P | P | P | P | P | P | P |
| | Heat resistance | P | P | P | P | P | P | P | P |

TABLE 3

| | | Comparative Example | | | | | | | | | | |
|---|---|---|---|---|---|---|---|---|---|---|---|---|
| | | A | B | C | D | E | F | G | H | I | J | K |
| size of electrical conduit (cross-section of conductor in $mm^2$) | | 0.14 | | | | | | | | | | |
| HPP | | 55 | 55 | 55 | 55 | 55 | 55 | 55 | 55 | 55 | 55 | 55 |
| MMHPP | | 25 | 25 | 25 | 25 | 25 | 25 | 25 | 25 | 25 | 25 | 25 |
| EPR | | 20 | 20 | 20 | 20 | 20 | 20 | 20 | 20 | 20 | 20 | 20 |
| PA6 | | 0 | 0 | 0 | 0 | 0 | 0 | 0 | 0 | 0 | 10 | 0 |
| PA66 | | 0 | 0 | 0 | 0 | 0 | 0 | 0 | 0 | 0 | 0 | 0 |
| PA-CP | | 10 | 50 | 75 | 100 | 0 | 0 | 0 | 0 | 0 | 0 | 0 |
| $Mg(OH)_2$ | | 60 | 60 | 60 | 60 | 70 | 90 | 100 | 110 | 120 | 80 | 80 |
| AA | | 5 | 5 | 5 | 5 | 5 | 5 | 5 | 5 | 5 | 5 | 5 |
| properties | Tensile elongation | F | F | F | F | F | F | F | F | F | P | P |
| | Flame out time | F | P | P | P | F | F | P | P | P | P | P |
| | Abrasion resistance | P | P | P | P | P | F | F | F | F | P | P |
| | Residual anti-aging agent | P | P | P | P | P | P | P | P | P | F | F |
| | Heat resistance | P | P | P | P | P | P | P | F | F | F | F |

Evaluation of the Polymeric Composition

The Examples 1 to 8 and Comparative examples A to K were respectively applied to a conductor having a cross-section of 0.14 $mm^2$ or 0.22 $mm^2$. Samples of the insulated electrical conduit were prepared by extruding the afore-mentioned various polymeric compositions. Each sample of the insulated electrical conduit had an outer diameter of 0.85 mm or 0.95 mm. During the extrusion, the temperature was set at 230° C.

In accordance with the present invention, since the polymeric composition can be extruded at a relatively low temperature, the polymeric composition is substantially free of risk of its thermal degradation.

The samples of the insulated electrical conduit were tested to determine their various properties including tensile elongation (rate), flame out time (i.e. flame retardant properties), abrasion resistance, residual anti-ageing agent (amount), and heat resistance.

Tensile Elongation (Rate)

Tensile elongation was tested to determine their mechanical properties required of polymeric cable covering. Tensile elongation was determined by the method of JIS C3005-4.16. In further detail, the conductor was respectively removed from each sample of the insulated electrical conduit. Each of coverings had a pair of markings spaced 50 mm apart. Both end portions of each covering were engaged to the chuck of a tensile testing machine, and were pulled in the speed of from 200 mm/min. Then, each of the distance between the pair of makings was measured in the respective covering. For the data, the elongation must be greater than or equal to 500% for the test sample to pass. The test sample having the elongation less than 500% failed this test.

Flame Out Time (Flame Retardant Properties)

Flame out time was tested to determine their flame retardant properties required of polymeric cable covering. Flame out time was determined by the method of JIS C3005-6.19 (refer to FIG. 11 therein). The insulated electrical conduit having a length of 600 mm was laid tilted at about 45 degrees angle. A portion which was 500 mm away from the upper end portion of the insulated electrical conduit and was a part of the insulated electrical conduit was treated with reducing flame for a period of 15 seconds. To evaluate flame retardant property of the test sample, flame-out time was measured. For the following data, the flame-out time must be within 70 seconds for the test sample to pass. The test sample having the flame-out time greater than 70 seconds failed this test.

Abrasion Resistance

This abrasion resistance was determined by the method of YPES-11-01-204, 6.99 (refer to FIG. 7 therein). In great detail, each sample of the insulated electrical conduit having a length of about 750 mm was secured, as shown in FIG. 7. A spring wire having a thickness of 0.45 mm+0.01 mm was made in contact with each sample of the insulated electrical conduit. In this position, each sample of the insulated electrical conduit was subjected to a load of 7N 0.05N. The number of the reciprocation was recorded for each sample. For the following data, the number of reciprocation must be equal to or greater than 300 to pass. The test sample having the number of reciprocation below 300 failed this abrasion resistance.

Heat Resistance

Each sample of the insulated electrical conduit was bent around a rotational axis, and then allowed to stand under an atmospheric condition for a period of 10,000 hours. Thereafter, the temperature that no crack was found in the sample was respectively recorded. The test sample was considered to "pass", in a case where it did not crack at a temperature of equal to or higher than 120° C. In other words, when the test sample represented crack resistance at a temperature of equal to or higher than 120° C., the test sample was considered to pass. On the contrary, the test sample was considered to "fail", in a case where it only represented crack resistance at a temperature of below 120° C.

Residual Anti-Aging Agent (Amount)

As for residual anti-aging agent (i.e., antioxidant), residual anti-aging agent must be equal to or greater than 90% by weight to pass, based on the weight of the anti-aging agent added. The test sample having residual anti-aging agent in an amount of less than 90% by weight (based on the weight of the anti-aging agent added) failed this test.

Each of residual anti-aging agent value was measured as follows:

2 G of the electrical covering portion of the insulated electrical conduit as mentioned previously was taken, frozen, and then milled. Thereafter, the test sample thus obtained was subjected to soxhlet extraction with chloroform solvent for a period of 10 hours. The extract thus obtained was further concentrated. Methanol was added to the concentrated extract until the mixture of methanol and the concentrated extract reached 40 ml in its total volume. The mixture was subjected to high-performance liquid chromatography (HSS-2000 System available from JASCO Corporation; Column: Mightysil RP-18GP (150 mm/4.6 mm) available from Kanto Kagaku; Temperature of column: 40° C.; Detector: UV (275 nm); Eluent: methanol; Flow rate: 1.0 ml/min; and Sample Input (amount): 10 µl).

The results of these five tests are summarized in Tables 2 and 3 above. In tables 2 and 3, "P" means "passed", and "F" means "failed". Tables 2 and 3 above show that all of the polymeric compositions useful as an insulated electrical conduit in accordance with the present invention exhibit improved tensile elongation, flame out time, abrasion resistance, residual degradation inhibitor, and heat resistance. Also, the polymeric composition in accordance with the present invention can be extruded or shaped at a temperature in a range of not incurring thermal degradation thereof. In addition, the polymeric composition in accordance with the present invention not only exhibits improved flame retardant properties, and but also produce an insulated electrical conduit dominating only small space.

In accordance with one aspect of the present invention, since a polymeric composition useful as an electrical conduit covering comprises 100 parts by weight of as a base polymer containing a polyolefin polymer, 2 to 45 parts by weight of a polyamide, and 60 to 90 parts by weight of a metal hydroxide, and the polyamide is a copolymer of polyamide 6 and polyamide 66, it has relatively lower melting point compared to the cable covering polymeric compositions of the prior art. Accordingly, the polymeric composition can be thereafter shaped at a temperature in a range of not incurring thermal degradation thereof. Also, the polymeric composition achieves excellent flame retardant properties. Furthermore, the polymeric composition is highly suited for preparing an insulated electrical conduit occupying only small space. Therefore, the resultant electrical conduit is suitable for use in a vehicle.

Particularly, in a case where a polyolefin polymer contains at least one polypropylene polymer therein, the resultant electrical conduit can achieve excellent heat resistance.

In accordance with another aspect of the present invention, since an insulated electrical conduit has an electrical conductor covered by the polymeric composition as stated above, the covering can be formed without compromising other characteristics required of a polymeric cable covering such as material strength and abrasion resistance. Furthermore, the insulated electrical conduit not only achieves good flame retardant properties, but occupies only small space.

The above embodiments and examples are given to illustrate the scope and spirit of the instant invention. These embodiments and examples will make apparent, to those skilled in the art. Other embodiments and examples are within the contemplation of the present invention. Therefore, the instant invention should be limited only by the appended claims.

The invention claimed is:

1. A polymeric composition useful as an electrical conduit covering, consisting of:
    100 parts by weight of a base polymer containing a polyolefin polymer;
    2 to 45 parts by weight of a polyamide, based on 100 parts by weight of the base polymer, wherein the polyamide is a copolymer of polyamide 6 and polyamide 66 and has melting point equal to or lower than 190° C.; and
    70 to 90 parts by weight of a metal hydroxide, based on 100 parts by weight of the base polymer,
    wherein the composition is flame-retardant composition;
    wherein the polyolefin polymer consists of polypropylene polymer and ethylene-propylene rubber; wherein the polypropylene polymer consists of homo-polypropylene and maleic acid-modified homo-polypropylene;
    wherein the homo-polypropylene and the maleic acid-modified homo-polypropylene are blended in a ratio of from 5:1 to 3:2; and
    wherein an average particle diameter of the metal hydroxide is from 0.1 µm to 20 µm.

2. The polymeric composition according to claim 1, wherein the metal hydroxide is a magnesium hydroxide.

3. The polymeric composition according to claim 1, wherein the polyolefin polymer consists of polypropylene polymer and ethylene-propylene rubber in a ratio of equal to or below 4:1.

4. An insulated electrical conduit having an electrical conductor covered by the polymeric composition according to claim 1.

5. An insulated electrical conduit having an electrical conductor covered by the polymeric composition according to claim 2.

6. An insulated electrical conduit having an electrical conductor covered by the polymeric composition according to claim 3.

* * * * *